United States Patent [19]

Mabuchi et al.

[11] 4,275,394
[45] Jun. 23, 1981

[54] RADIO CONTROL DRIVING CIRCUIT DEVICE

[75] Inventors: Kenichi Mabuchi, Matsudo; Koziro Komatsu, Tokyo, both of Japan

[73] Assignee: Mabuchi Motor Co. Ltd., Tokyo, Japan

[21] Appl. No.: 74,342

[22] Filed: Sep. 11, 1979

[30] Foreign Application Priority Data

Sep. 26, 1978 [JP] Japan ............................ 53-131971[U]

[51] Int. Cl.³ ....................... H04B 7/00; B60K 27/00
[52] U.S. Cl. ..................................... 340/694; 46/254; 180/168; 318/16; 318/78
[58] Field of Search ................................ 340/694–696; 318/16, 112, 78, 98, 99, 314, 581; 180/2 R, 167, 168, 169; 46/248, 253, 254; 455/352, 353, 603

[56] References Cited

U.S. PATENT DOCUMENTS

| 3,720,281 | 3/1973 | Frownfelter | 340/694 |
| 3,856,104 | 12/1974 | Ohba | 318/16 |
| 4,168,468 | 9/1979 | Mabuchi et al. | 340/695 |

Primary Examiner—John W. Caldwell, Sr.
Assistant Examiner—Donnie L. Crosland

[57] ABSTRACT

A radio control driving circuit device used for a model device having a radio control system comprising a d-c power supply, two electric motors and a receiver, characterized in that two transistors of the same type, instead of the conventional complementary type, are used as two transistors each connected in series to the right and left motors for separately driving each of the motors, and a common power supply is used for driving the motors to permit control signals from the receiver to be introduced via a phase division circuit.

4 Claims, 9 Drawing Figures

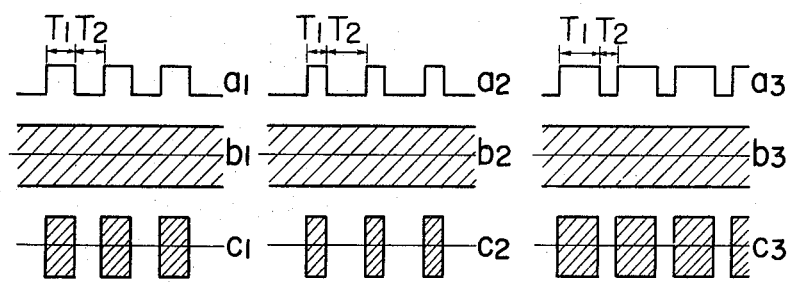
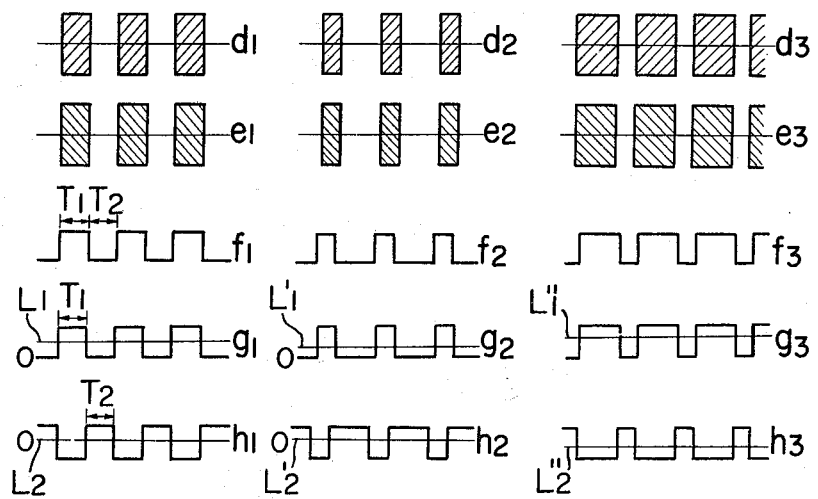

RADIO CONTROL DRIVING CIRCUIT DEVICE

BACKGROUND OF THE INVENTION

1. Field of the Invention

This invention relates generally to a radio control driving circuit device, and more particularly to a radio control driving circuit device used for a model toy equipped with a d-c power supply, a receiver and two electric motors and travelling by receiving control signals transmitted from a transmitter, wherein transistors of the same type and used as two driving transistors.

2. Description of the Prior Art

In general, the model car, etc. having a radio control system has such a construction that two electric motors are equipped for separately driving each of the right and left driving wheels so that variable width control pulse signals transmitted by a transmitter can control the travelling direction and speed of the model car. In this type of driving circuit device, two transistors of the complementary type each having operating characteristics opposite to each other are usually used for each of the right and left motors. That is, each of the complementary type transistors is controlled by control pulse signals inputted from a single terminal, and two separate power supplies are used for driving the right and left wheels. In this circuit configuration, however, the difference in the characteristics of the complementary type transistors constituting the circuit and the difference in the degree of exhaustion between two batteries connected to the right and left motors may cause variations in revolution between the right and left motors.

In other words, since this circuit device is based on the operating principle that control pulses transmitted by a transmitter is received by a receiver on board the model car to drive the right and left wheels of the model car in accordance with the polarity and width of the received control pulses, the model car can travel straightforward by setting the duty factor of the control pulse width at 50%, thereby making the revolution of the right and left motors equal. In this type of conventional circuit device, however, the model car cannot necessarily travel straightforward at the duty factor of 50% due to the fact that the received control pulse signals are supplied to the complementary transistors, and that the right and left motors are driven by separate batteries.

SUMMARY OF THE INVENTION

It is an object of the present invention to provide a radio control driving circuit device which overcomes the aforementioned problems.

It is another object of the present invention to provide a radio control driving circuit device which overcomes the aforementioned problems by giving such a construction that two transistors of the same type can be used, in place of complementary type transistors, with the use of a phase division circuit, and using a common power supply for driving right and left wheels.

It is still another object of the present invention to provide a radio control driving circuit device in which double-collector type transistors are used as a polarity discriminating means in introducing the control pulse signals received via the phase division circuit.

These and other objects of the present invention will become apparent from the following description taken in connection with the accompanying drawings.

BRIEF DESCRIPTION OF THE DRAWINGS

FIG. 4 is a group of waveform diagrams of control pulses to be transmitted by a transmitter.

FIG. 5 is a group of waveform diagrams of control pulses to be received by a receiver.

DETAILED DESCRIPTION OF THE EMBODIMENT

Figure 1:
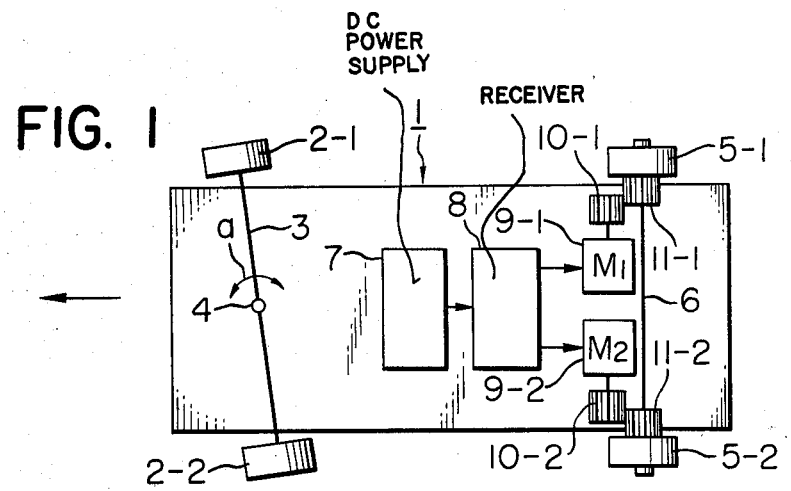
FIGS. 1 through 3 are diagrams of assistance in explaining the problems the present invention is intended to overcome, illustrating the construction and functions of a radio control driving circuit device.

FIG. 1 shows a radio control driving circuit device embodying this invention. In FIG. 1, numeral 1 refers to a model car, and 2-1 and 2-2 to right and left front wheels thereof. Numeral 3 refers to a rotating shaft to which the front wheels 2-1 and 2-2 are fixedly connected, and which is constructed so that it can be swinged in the direction shown by an arrow a around a pivot 4. Numerals 5-1 and 5-2 refer to right and left rear wheels which are freely rotatably engaged with a shaft 6 and caused to rotate by means of gears 11-1 and 11-2, which will be described later. Numeral 7 refers to a d-c power supply, 8 to a receiver, 9-1 and 9-2 to motors having almost the same rotating characteristics, 10-1 and 10-2 to transmission gears connected to the rotating shaft of the motors 9-1 and 9-2, respectively, 11-1 and 11-2 to driving gears in mesh with the transmission gears 10-1 and 10-2 for driving the rear wheels 5-1 and 5-2.

Figure 2:
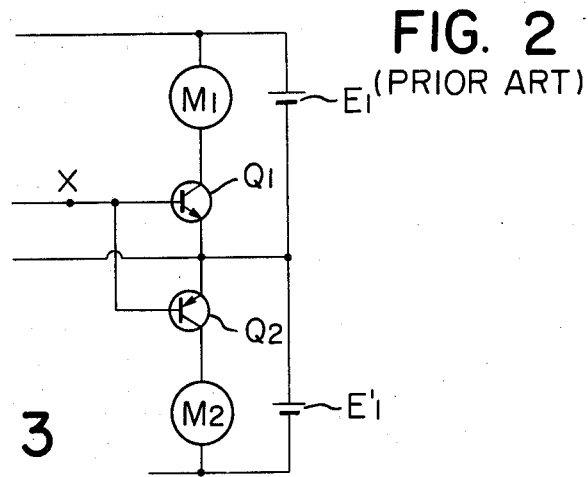

In the conventional radio control driving circuit device having the aforementioned construction, the receiver is equipped on board the model car, as shown in FIG. 1, but the motor driving circuit at the final stage of the receiver 8 has such a construction as shown in FIG. 2. That is, symbols M1 and M2 in FIG. 2 refers to motors corresponding to those shown in FIG. 1, to which transistors Q1 and Q2 are connected in series, respectively, as switching elements for alternately operating the motors, the transistors Q1 and Q2 being of the complementary type. Symbols E1 and E1' refer to batteries individually connected in parallel to the motors M1 and M2, respectively, the battery E1 driving the motor M1 and the battery E1' driving the motor M2.

Figure 3:
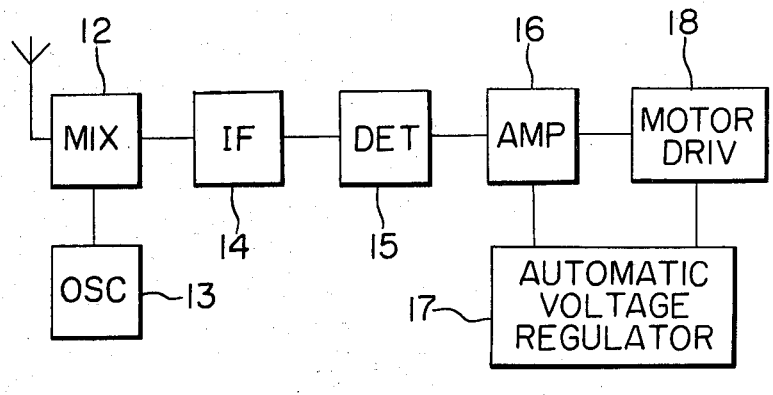

Assuming that a control pulse signal transmitted by a transmitter (not shown) is received and arrives at the point X shown in FIG. 2 via a series of receiving circuits shown in FIG. 3, the NPN type transistor Q1 constituting the complementary circuit is brought into conduction during the positive half-wave cycle of said signal to cause the motor M1 to be driven by the battery E1 while the PNP type transistor Q2 is in the non-conducting state. Next, during the negative half-wave cycle following the positive half-wave cycle, the operation is reversed, i.e., the transistor Q2 becomes conducting to cause the motor M2 to be driven by the battery E1' while the transistor Q1 is held in the non-conducting state. Thus, the travelling of the model car is controlled in accordance with the duty cycle of the control pulses received. However, the use of two transistors having complementary type characteristics and the provision of two separate batteries for driving the right and left wheels may cause problems in discriminating the polarity of the control pulses.

Figure 6:
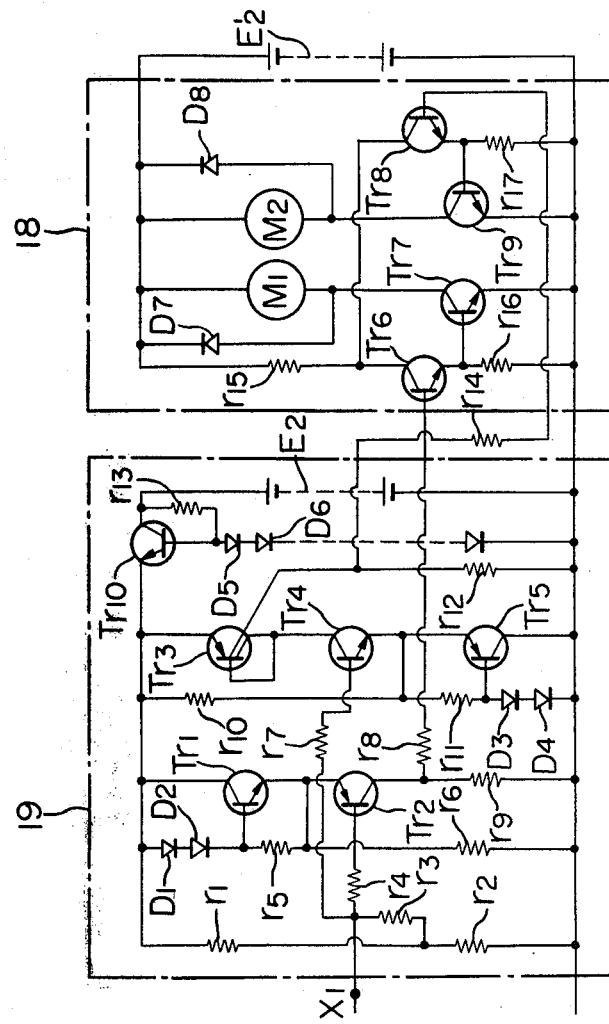
FIG. 6 is a wiring diagram of a motor driving circuit embodying the present invention.

This invention is intended to ensure the stable control of motor revolution by control pulse signals by using transistors of the same type (either of the NPN or PNP type), instead of the complementary type as in the conventional radio control driving circuit device for those connected in series to the right and left motors M1 and M2, and using a common power supply to drive the motors, and employing such a construction as to allow the switching transistor input to be introduced via a phase division circuit. An embodiment of this invention as shown in FIG. 6 will be described in the following, referring to FIGS. 3 through 5.

FIG. 3 is a block diagram of the inside of the receiver 8. In the figure, numeral 12 refers to a tuning/frequency mixing circuit, 13 to a local oscillation circuit, 14 to an intermediate frequency amplifier circuit, 15 to a detection circuit, 16 to a low frequency amplifier circuit and phase division circuit, 17 to an automatic voltage regulating circuit, 18 to a motor driving and controlling circuit, respectively.

Now, the motor driving circuit will be described, referring to FIG. 6. FIG. 6 corresponds with FIG. 2 illustrating the conventional circuit device. In the figure, numeral 19 refers to a phase division circuit. Symbols Tr1, Tr2, Tr3, Tr4, Tr5, Tr6, Tr7, Tr8 and Tr9 refer to transistors, respectively; Tr3 being a double-collector type transistor, Tr7 and Tr9 being power transistors, r1 through r17 to resistors, D1 through D8 to diodes, E2 and E2' to batteries, respectively.

The transistors Tr1 and Tr2 are connected in series, particularly, the transistors Tr1 forming the socalled constant current circuit since its base current is determined by diodes D1 and D2. The transistor Tr6, which is forward-biased when the transistor Tr2 conducts, is connected to the motor power supply E2' and causes the power transistor Tr7 to conduct to drive the motor M1. On the other hand, the transistor Tr4 has the same input terminal as that of the transistor Tr2, and the collector thereof is connected to one of the collectors of the double-collector type transistor Tr3 and the emitter thereof to the emitter of the transistor Tr5. The transistor Tr5 constitutes a constant current circuit, together with the diodes D3 and D4. Consequently, as the transistor Tr4 conducts, the double-collector type transistor Tr3 is also caused to conduct, forward-biasing the transistor Tr8 connected to the motor driving circuit to bring the power transistor Tr9 into conduction to drive the motor M2. The transistor Tr10 is constructed so as to ensure a base voltage of constant potential, taking advantage of voltage drop in the diodes D5 and D6, and forms a constant voltage circuit with respect to the transistors Tr2 and Tr4. The diodes D7 and D8 are used for preventing kick-off voltages generated when the motor circuit is turned on or off.

Assuming that a control pulse signal is transmitted by a transmitter (not shown) and arrives at the input terminal X1 of the phase division circuit at the preceding stage of the motor driving circuit via a series of receiving circuit shown in FIG. 3, the control pulse signal is divided into two signals of opposite phase by the phase division circuit 19 shown in FIG. 6, each of the two signals controlling the transistors Tr6 and Tr8, thus driving the motors M1 and M2, respectively, which are connected in parallel to the same power supply E2'.

In the following, each case of the control pulse signals as shown in FIG. 4 transmitted by a transmitter (not shown) will be described.

(1) When a signal having an output waveform shown by a1 in FIG. 4 (A) is transmitted by adjusting the transmitter (not shown) (T1=T2), a carrier wave as shown by b1 in FIG. 4 (A) generated in the oscillation circuit of the transmitter is modulated by the output waveform a1 and transmitted as an intermittent radio wave as shown by c1 in FIG. 4 (A).

(2) As in the case of (1) above, when the output waveform assumes a waveform as shown by a2 in FIG. 4 (B) (T1<T2), a carrier wave as shown by b2 in FIG. 4 (B) generated in the oscillation circuit of the transmitter is modulated by the output waveform a2 and radiated as a radio wave as shown by c2 in FIG. 4 (B).

(3) Similarly, when the output waveform assumes a waveform as shown by a3 in FIG. 4 (C) (T1>T2), a carrier wave as shown by b3 in FIG. 4 (C) generated in the oscillation circuit of the transmitter is modulated by the output waveform a3 and radiated as a radio wave as shown by c3 in FIG. 4 (C).

Each case of (1), (2) and (3) above on the transmitter side will be described on the receiver side.

(1)' The radio wave as shown by c1 in FIG. 4 (A) is received by a receiver antenna shown in FIG. 3 (e1 in FIG. 5 (A)), converted into a low frequency output waveform as shown by f1 in FIG. 5 (A) (T1=T2) via a series of receiver circuits, and applied to an input terminal X1 of the phase division circuit 19 in FIG. 6. This control pulse signal is divided at the input terminal X1 of the phase division circuit 19 into two signals g1 and h1 with a 180° phase difference with each other to control each of the motors. That is, the transistors Tr4, Tr3 and Tr5 are caused to conduct during the positive half-wave cycle, for example, of the signal f1, and the conduction of the double-collector type transistor Tr3 causes the power transistor Tr9 to operate the motor M2. On the other hand, during the negative half-wave cycle of the signal f1, the transistors Tr2 and Tr1 are caused to conduct, and thereby the power transistor Tr7 is caused to conduct to operate the motor M1. In this case, each drive current to be fed to the motors M1 and M2 assumes the mean values of the signals as shown by h1 and g1 in FIG. 5 (A). Consequently, the mean value L1 of the drive current g1 is equal to the mean value L2 of the drive current h1. Together with this, the use of the power transistors Tr7 and Tr9 of the same type and the use of a single power supply E2' to power each of the motors keep the motors running at the same revolution, thus causing the model car to travel straightforward.

(2)' The radio wave shown by c2 in FIG. 4 (B) is received by an antenna shown in FIG. 3 (e2 in FIG. 5 (B)), converted into a low frequency output waveform shown by f2 in FIG. 5 (B) (T1<T2) via a series of receiver circuits, and applied to the input terminal X1 of the phase division circuit 19 in FIG. 6. This control pulse signal is divided at the input terminal X1 of the phase division circuit 19 into two signals g2 and h2 with a 180° phase difference with each other to operate each of the motors. That is, the transistor Tr4 is brought into conduction during the positive half-wave cycle, for example, of the signal f2 to operate the motor M2, as in the case of (1)' above. On the other hand, during the negative half-wave cycle of the signal f2, the transistor Tr2 is brought into conduction to operate the motor M1. In this case, the revolution of each motor is in accordance with the pulse width of the coming control pulse f2 (T1<T2). That is, a drive current given by the mean value of the signal h2 shown in FIG. 5 (B) is fed to the motor M1 while a drive current given by the mean value of the signal g2 shown in the same figure is fed to the motor M2. Consequently, the mean value L2' of the drive current h2 becomes larger than the mean value L1' of the drive current g2. Together with this, the use of the power transistors Tr7 and Tr9 having the same polarity and the use of a single power supply E2' to operate the motors make the revolution of the motor M1 larger than that of the motor M2, thus causing the model car to make a turn.

(3)' The radio wave shown by c3 in FIG. 4 (C) is received by an antenna shown in FIG. 3 (e3 in FIG. 5 (C)), converted into a low frequency output waveform as shown by f3 in FIG. 5 (C) (T1>T2), and applied to the input terminal X1 of the phase division circuit 19 shown in FIG. 6. This control pulse signal is divided at the input terminal X1 of the phase division circuit 19 into two signals g3 and h3 with a 180° phase difference with each other to operate each of the motors. That is, the transistor Tr4 is brought into conduction during the positive half-wave cycle, for example, of the signal f3, to operate the motor M2, as in the case of (2)' above, on the other hand, during the negative half-wave cycle of the signal f3, the transistor Tr2 is caused to conduct to operate the motor M1. In this case, the revolution of each motor is in accordance with the characteristics of the coming control pulse f3 (T1>T2) for similar reasons as in the case of (2)' above.

That is, a drive current given by the mean value of the signal h3 shown in FIG. 5 (C) is fed to the motor M1 while a drive current given by the mean value of the signal g3 shown in FIG. 5 (C) is fed to the motor M2. Consequently, the mean value L2" of the drive current h3 becomes smaller than the mean value L1" of the drive current g3. This makes the revolution of the motor M1 smaller than that of the motor M2.

As described above, a phase division circuit is provided, according to this invention, at the preceding stage of the motor driving circuit to divide a coming control pulse signal into two signals with a 180° phase difference with each other to operate power transistors for driving the motors. This eliminates the need for the use of two complementary type transistors having the same characteristics, and enables the use of a single power supply for driving the right and left motors. Furthermore, the use of power transistors of the same type for driving the motors simplifies the manufacturing process in making the circuit of IC configuration, resulting in substantial reduction of manufacturing costs.

What is claimed is:

1. A radio control driving circuit for use in a model device having a radio control system including two motors respectively operating two wheels of the model device and a receiver for receiving a single radio control signal for controlling the revolution of each of the two motors, said control driving circuit comprising, power transistors of the same type respectively connected in series with each of the two motors to thereby form two series circuits, a single d-c power supply for supplying energy to said two series circuits connected in parallel with each other, and a phase division circuit for dividing the single radio control signal into two signals with a 180° phase difference with each other, said phase division circuit comprising two input transistors to which the single control signal is supplied, a constant current circuit respectively connected in series with each of said input transistors, said two input transistors respectively coupled to a corresponding power transistor such that the two signals produced by said phase division circuit and applied to said power transistors control them such that one of the power transistors is kept in the OFF state when another of the power transistors is in the ON state whereby the motors operate alternately.

2. A radio control driving circuit as in claim 1, wherein the single radio control signal comprises a cyclical wave whose pulse widths of the positive and negative half cycles represent the desired driving of the respective two motors.

3. A radio control driving circuit as in claim 1 or 2, wherein one of the two input transistors is connected in series with a double collector type transistor.

4. A radio control driving circuit as in claim 3, and further comprising a constant voltage circuit for producing a constant level source voltage to the phase division circuit.

* * * * *